US008458192B1

(12) United States Patent
Procopio

(10) Patent No.: US 8,458,192 B1
(45) Date of Patent: Jun. 4, 2013

(54) SYSTEM AND METHOD FOR DETERMINING TOPIC INTEREST

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/363,169

(22) Filed: Jan. 31, 2012

(51) Int. Cl.
*G06F 17/30* (2006.01)

(52) U.S. Cl.
USPC ......................................................... 707/748

(58) Field of Classification Search
USPC ................................................. 707/748, 732
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2006/0195461 A1 | 8/2006 | Lo et al. | |
| 2007/0078889 A1 | 4/2007 | Hoskinson | |
| 2009/0287682 A1* | 11/2009 | Fujioka et al. | 707/5 |
| 2011/0016121 A1* | 1/2011 | Sambrani et al. | 707/734 |
| 2011/0197166 A1* | 8/2011 | Girgensohn et al. | 715/846 |
| 2011/0258229 A1 | 10/2011 | Ni et al. | |
| 2012/0059735 A1* | 3/2012 | Su et al. | 705/26.7 |
| 2012/0316960 A1* | 12/2012 | Yang | 705/14.53 |

OTHER PUBLICATIONS

Recognizing user interest and document value from reading and organizing activities in document triage, Rajiv Badi, Soonil Bae, J. Michael Moore, Konstantinos Meintanis, Anna Zacchi, Haowei Hsieh, Frank Shipman Department of Computer Science Texas A&M University College Station, TX 77843-3112 USA, IUI'06, Jan. 29-Feb. 1, 2006, Sydney, Austra.*
U.S. Appl. No. 13/363,024, filed Jan. 31, 2012, Procopio et al.
U.S. Appl. No. 13/363,607, filed Jan. 31, 2012, Procopio et al.
U.S. Appl. No. 13/363,152, filed Jan. 31, 2012, Procopio.
U.S. Appl. No. 13/363,126, filed Jan. 31, 2012, Procopio.
U.S. Appl. No. 13/363,094, filed Jan. 31, 2012, Procopio et al.

(Continued)

*Primary Examiner* — Kimberly Wilson
*Assistant Examiner* — Hau H Hoang
(74) *Attorney, Agent, or Firm* — Young, Basile, Hanlon & MacFarlane, P.C.

(57) ABSTRACT

A method and system for determining topical interest may include receiving signal information for a user of a document, the information including at least one signal value representing the user's activity with or relationship to the document. A document interest value based on the signal information for the user may be computed. Topic information for the document may be received, the information including at least one topic and a weight for each topic, where the topic relates to content of the document, and the weight represents how strongly the topic is associated with the document. An interest signature value of a first topic for the user may be updated by adding the product of the computed document interest value for the user for the document and the weight of the first topic for the document.

20 Claims, 5 Drawing Sheets

OTHER PUBLICATIONS

U.S. Appl. No. 13/363,210, filed Jan. 31, 2012, Procopio.
U.S. Appl. No. 13/363,195, filed Jan. 31, 2012, Procopio.
U.S. Appl. No. 13/363,221, filed Jan. 31, 2012, Procopio.
James Allan, "Topic Detection and Tracking-Event-Based Information Organization," 2002, Kluwer Academic Publishers, Norwell, Massachusetts, USA; http://books.google.com/books?hl=en&lr=&id=50hnLI_Jz3cC&oi=fnd&pg=PR9&dq=topic+detection+and+tracking+event-based+information+organization&ots=nfu5nDwUa0&sig=U2ITFv2_AMnciqo9J8WLaS9lv98#v=onepage&q=topic%20detection%20and%20tracking%20event-based%20inform&f=false (last visited on Jan. 31, 2012).
Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).
Dr. E. Garcia, "Cosine Similarity and Term Weight Tutorial," http://www.miislita.com/information-retrieval-tutuorial/cosine-similarity-tutorial.html (last visited on Jan. 30, 2012).

* cited by examiner

DOCUMENT 1 - SIGNATURE

| TOPIC | WEIGHT |
|---|---|
| A | 0.70 |
| B | 0.30 |

DOCUMENT 2 - SIGNATURE

| TOPIC | WEIGHT |
|---|---|
| B | 0.05 |
| C | 0.95 |

DOCUMENT 3 - SIGNATURE

| TOPIC | WEIGHT |
|---|---|
| C | 1.0 |

DOCUMENT 4 - SIGNATURE

| TOPIC | WEIGHT |
|---|---|
| A | 0.50 |
| B | 0.35 |
| D | 0.15 |

*FIG. 2*

| SIG. NO. 310 | SIGNAL 320 | VALUE 330 | NORMALIZED VALUE 340 | SIGNAL WEIGHT 350 | INTEREST VALUE ENTRY 360 |
|---|---|---|---|---|---|
| 1 | Has user opened document once? | YES | 1.0 | 0.1 | 0.1 |
| 2 | Number of times user opened document? | 8.0 | 0.4 | 0.1 | 0.04 |
| 3 | How recently the user opened the document? | 2 HOURS AGO | 0.8 | 0.1 | 0.08 |
| 4 | The span of time in which a user is known to have opened the document (e.g., now and again over a period of years, total time over a time interval) | 3 HOURS | 0.3 | 0.2 | 0.06 |
| 5 | Whether the user is currently "subscribed" to the document? | YES | 1.0 | 0.05 | 0.05 |
| 6 | The degree of subscription: Not on the Access Control List (ACL) but "subscribed," implicitly on the ACL by way of group membership, explicitly on the ACL by specific entry. | EXPLICITLY | 1.0 | 0.1 | 0.1 |
| 7 | Permissions / Level of Access? | EDITOR | 0.7 | 0.1 | 0.07 |
| 8 | Whether the user has starred the document? | NO | 0.0 | 0.1 | 0.0 |
| 9 | Whether the user has ever edited the document? | YES | 1.0 | 0.1 | 0.1 |
| 10 | Whether the user has shared the document? | NO | 0.0 | 0.05 | 0.0 |
| | DOCUMENT INTEREST VALUE | | | | 0.6 |

FIG. 3

USER X - DOCUMENT INTEREST VALUES — 410

| DOCUMENT NUMBER | DOCUMENT INTEREST VALUE |
|---|---|
| DOCUMENT 1 | 0.6 |
| DOCUMENT 2 | 0.3 |
| DOCUMENT 3 | 0.4 |
| DOCUMENT 4 | 0.9 |

USER X - INTEREST SIGNATURE

| TOPIC | D1 | D2 | D3 | D4 | TOTAL |
|---|---|---|---|---|---|
| A | (0.6 x 0.7) | — | — | (0.9 x 0.5) | 0.87 |
| B | (0.6 x 0.3) | (0.3 x 0.05) | — | (0.9 x 0.35) | 0.51 |
| C | — | (0.3 x 0.95) | (0.4 x 1.0) | — | 0.69 |
| D | — | — | — | (0.9 x 0.15) | 0.14 |

AGGREGATE TOPIC INTEREST VALUE (ACROSS ALL DOCUMENTS)

FIG. 4

SYSTEM AND METHOD FOR DETERMINING TOPIC INTEREST

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,067 is now pending, filed Jan. 31, 2012 for "SYSTEM AND METHOD FOR INDEXING DOCUMENTS";

Ser. No. 13/363,024 is now pending, filed Jan. 31, 2012 for "SYSTEM AND METHOD FOR COMPUTATION OF DOCUMENT SIMILARITY";

Ser. No. 13/363,152 is now pending, filed Jan. 31, 2012 for "SYSTEM AND METHOD FOR CONTENT-BASED DOCUMENT ORGANIZATION AND FILING";

Ser. No. 13/363,126 is now pending, filed Jan. 31, 2012 for "SYSTEM AND METHOD FOR DETERMINING ACTIVE TOPICS";

Ser. No. 13/363,094 is now pending, filed Jan. 31, 2012 for "SYSTEM AND METHOD FOR AUTOMATICALLY DETERMINING DOCUMENT CONTENT";

Ser. No. 13/363,210 is now pending, filed Jan. 31, 2012 for "SYSTEM AND METHOD FOR DETERMINING TOPIC AUTHORITY";

Ser. No. 13/363,195 is now pending, filed Jan. 31, 2012 for "SYSTEM AND METHOD FOR DETERMINING SIMILAR USERS"; and Ser. No. 13/363,221 is now pending, filed Jan. 31, 2012 for "SYSTEM AND METHOD FOR DETERMINING SIMILAR TOPICS."

BACKGROUND

Databases may include large quantities of documents including content covering a wide variety of topics. Each document may be viewed, drafted, edited, and/or interacted with by one or more users. Each of the many users may have interests in one or more topics, and it may be desirable to determine users with interest in a certain topics.

SUMMARY

Briefly, aspects of the present disclosure are directed to methods and systems for receiving signal information for a user of a document, the information including at least one signal value representing the user's activity with or relationship to the document. A document interest value based on the signal information for the user may be computed. Topic information for the document may be received, the information including at least one topic and a weight for each topic, where the topic relates to content of the document, and the weight represents how strongly the topic is associated with the document. An interest signature value of a first topic for the user may be updated by adding the product of the computed document interest value for the user for the document and the weight of the first topic for the document.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example (s) and not limited in the accompanying figures.

BRIEF DESCRIPTION OF THE DRAWINGS

A more complete understanding of the present disclosure may be realized by reference to the accompanying figures in which:

FIG. 2 is a diagram of document signatures according to aspects of the present disclosure;

FIG. 3 is a diagram of a signals table for a user of a document according to aspects of the present disclosure;

FIG. 4 is a diagram of document interest values and interest signature values according to aspects of the present disclosure.

Figure 1:
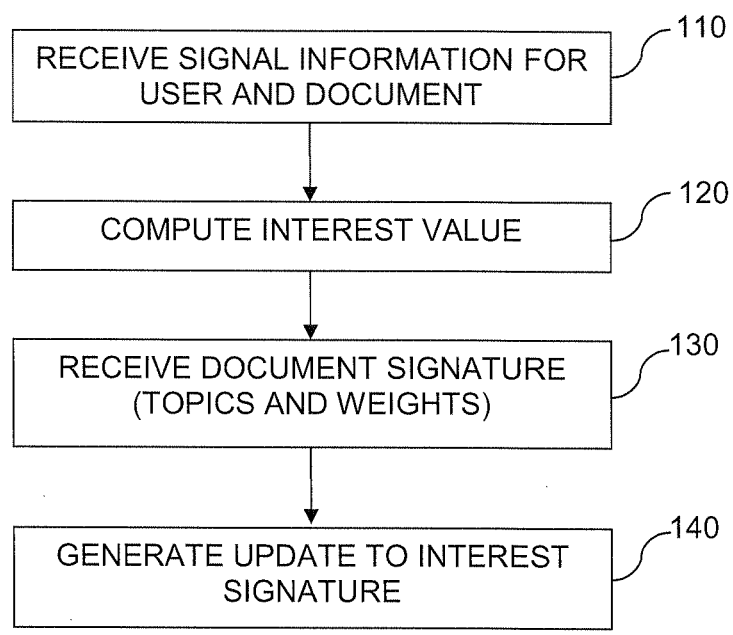
FIG. 1 is a flowchart of a method according to aspects of the present disclosure.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 5:
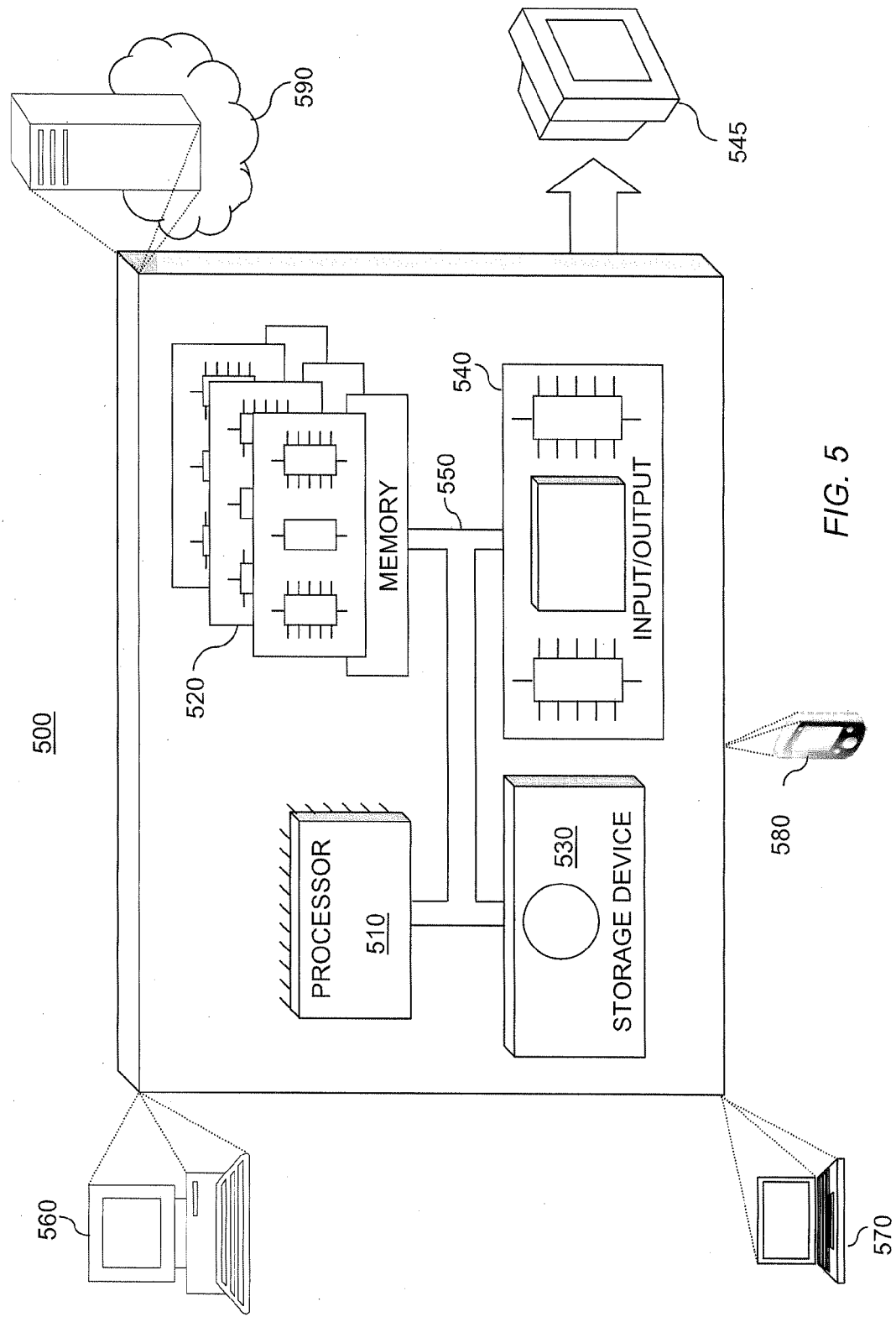
FIG. 5 is a schematic diagram depicting a representative computer system for implementing and exemplary systems and methods for determining topic interest according to aspects of the present disclosure.

In FIG. 1, there is shown a flow diagram 100, which defines steps of a method according to aspects of the present disclosure. Methods and systems of the present disclosure may be implemented using, for example, a computer system 500 as depicted in FIG. 5 or any other system and/or device.

In operation 110, signal information for a user of a document may be received by, for example, system 500. Signal information (e.g., feature information) for a user of a document may include at least one signal value (e.g., a feature value) representing the user's activity with and relationship to the document.

Signal information (e.g., signal information for a user) may include one or more signals and each of the one or more signals may have a signal value. Each of one or more signals may represent a user's activity with and/or relationship to a document including, for example, user document interaction, document subscription, document access, document editing, and/or document sharing characteristics, patterns, behavior and/or interactions. Each signal may be associated with a signal value for that signal. Signal values may quantify a user's activity with, association with, and/or relationship to a document.

Signal values may, in some aspects, be included a stream of data or information (e.g., a continuous stream of signal values). Signal values may be received by, for example, sampling, measuring, and/or recording signal values from a stream of signal values at a point in time or over a range of time.

Each signal may, for example, be associated with a signal weight. A signal weight associated with a signal (e.g., a signal value) may represent, for example, a relative importance, criticality, and/or weight of that signal relative to other signals (e.g. for a user of a document).

In some aspects, a user's activity with and/or relationship to a document may include, for example, user document interaction, document subscription, document access, document editing, and/or document sharing characteristics, patterns, behavior and/or interactions. For example, user document interaction may, for example, include whether a user has opened a document, how many times a user has opened a document, how recently a user has opened a document, a span of time a user has a document open (e.g., including multiple separate document use sessions), and/or other characteristics. User document subscription characteristics may, for example, include whether the user is subscribed to the document, a degree of subscription (e.g., not on an Access Control List (ACL) but subscribed, implicitly on the ACL by way of, for example, membership in a group, explicitly on the ACL by specific entry), and/or other characteristics. User document access characteristics may, for example, include a level of user access (e.g., read-only, write, and/or owner access), whether the user has "starred" the document (e.g., indicated that the document is important, associated a tag, bookmark, and/or note with the document), and/or other characteristics. User document editing characteristics may include, for example, whether the user has edited the document at any time, whether the user has edited the document within a given time period (e.g., one week, one day, or any other time period), and/or other characteristics. User sharing characteristics may include, for example, whether the user has shared the document with other users or groups of users by, for example, emailing, uploading, transferring, allowing access to, and/or otherwise sharing the document.

Documents discussed herein may include document text and/or content. Document text may be, for example, a text-based representation of a document. The document may include text (e.g., a word processing document, text file, portable document format (PDF), spreadsheet, or presentation) or may have text associated therewith, such as in a transcript, when the document is a video (e.g., a web-based video, digital video file, or any other type of video), an audio file (e.g., an audio recording, podcast, or any type of audio), and/or another type of electronically stored file. Document text may be present in a document text file separate from the document. In that case, the document text file may be linked to and/or stored with the document and/or may be stored separately. It will be understood that operations involving the text of a document may be performed on or with the document or the document text file depending on the location of text.

In operation 120, a document interest value based, for example, on signal information for a user may be computed. A document interest (e.g., an interest value) value may be computed, calculated, or generated by, for example, multiplying each of one or more signal values by a signal weight (e.g., weight) associated with each signal value, and summing, aggregating and/or adding up the products of each of the signal values and signal weights. In some aspects, a signal value may be normalized, scaled, and/or interpolated, and a normalized signal value for each signal may be multiplied by a signal weight. A sum of products of one or more normalized signals and corresponding signal weights may be summed, aggregated, and/or added up to compute, calculate, or generate a document interest value. A document interest value may, for example, be a number (e.g., between 0.0 and 1.0 or any other range), a percentage, and/or any other value.

Signal information (e.g., signal information for a user) may include one or more signals and each of the one or more signals may have or be associated with a signal value. Signal values may, for example, represent, quantify, and/or define a user's activity with, association with, and/or relationship to a document. Signal values may, for example, be many different types of values including, for example, a number (e.g., 0, 1 or any number), a period of time (e.g., 3 hours, 20 minutes, or any other period of time), a string and/or text value (e.g., "editor", "read only", and/or any other string or text), a Boolean value and/or binary value (e.g., "true" or "false", "yes" or "no"), a categorical value (e.g., a categorical and/or nominal value among an enumeration of values), and/or any other value depending on the type of signal. A categorical value may be a value among an enumeration, list, or set of categories, such that each category may be associated with a value (e.g., VIEWER=0.0, COMMENTER=0.3, EDITOR=0.7, OWNER=0.8, or other values). In some aspects, an enumeration of category values may be predefined (e.g., by a user, system designer, or by system 500). In some aspects, signal values may be normalized such that each signal value is in the range of, for example, zero to one (e.g., 0.0 to 1.0) or any other range. For example, signal values in units of a period of time (e.g., minutes, hours, and/or any other period of time), strings or text (e.g., "editor", "explicitly subscribed", "yes", "no", or any other string and/or text), numerical values (e.g., 0 or 1), and/or any other type of signal value may be normalized, converted, scaled, interpolated, and/or transformed to a normalized signal value of, for example, a number between 0.0 and 1.0, a percentage, or any other value.

Each signal may, for example, be associated with a signal weight. A signal weight associated with a signal (e.g., a signal value) may represent, for example, a relative importance, criticality, and/or weight of that signal relative to other signals (e.g. for a user of a document). Each of one or more signal weights for a user of a document may be, for example, be a percentage, a number between 0.0 and 1.0, or any other value. In some aspects, each of one or more signal weights may sum to, for example, 1.0, 100%, or any other value. Signal weights may be defined by a user (e.g., a system designer or other user), in an automatic learning process, by system 500, and/or by any other system and/or device.

A document interest value (e.g., for a user of a document) may be, for example, a sum of products of each signal value (e.g., a normalized signal value) and signal weight associated with each signal. For example, each signal value (e.g., a normalized signal value) may be multiplied by a weight associated with that signal, and a sum, aggregation, and/or combination of the products (e.g., a linear combination, namely, a sum of products) of each signal value and associated weight may be equal to a document interest value (e.g., for a user for a document).

In some aspects, document interest values may be generated for multiple users of a document. Multiple users may, for example, interact with a document and each user may be associated with signal information (e.g., including at least one signal value). For each of the multiple users of a document, a document interest value may be computed (e.g., independently computed) based on the signal information for that user. Each signal value for a user of document may, for example, be normalized and multiplied by a weight associated with that signal. A sum of the products of weights and signal values for a user may, for example, be equivalent to a document interest value for that user for that document. Document interest values for one or more users for a document may be computed based on signal values for each of the one or more users of the document and signal weights for each signal. In some aspects, document interest values for all users for a document may be computed based on signal values for each user of the document and signal weights for each signal.

In some aspects, document interest values for a user for a document may be computed, received, calculated and/or recalculated periodically (e.g., every 2 hours, 1 week, or any other time period), in response to a trigger event (e.g., receipt of new document signatures for a new or existing document, addition of information to a document, removal of information from a document, a change in a user's relationship with a document, or any other event), or for any other reason.

In operation 130, a document signature may be received by, for example, system 500. A document signature (e.g., topic information, signature information) may include, for example, at least one topic and a weight for each topic. Topic(s) may, for example, relate to content and/or text of a document, and a weight for a topic may, for example, represent how strongly the topic is associated with the document.

Topics may be, for example, categories, abstract ideas, subjects, things, and/or concepts representing the content or subject matter of a document. Topics may be, for example, an abstract notion of what a document text pertains to, is related to, and/or is about. A topic may, in some aspects, be a concept that at least a portion of the document is about. A topic may or may not be a term present in a document text but may be, for example, associated with one or more terms present in a document and may be generated by natural language processing or other processes based on one or more terms in a document and/or other information. For example, a document may include text about cars, planes, and boats, all of which appear as terms verbatim in the document. More abstractly, however, it may be determined that the document is about "vehicles" and "modes of transportation." Topics associated with the document may, therefore, be "vehicles," "modes of transportation," and/or other topics.

A weight (e.g., a topic weight or confidence score) may represent how strongly a topic is associated with a document (e.g., document text). A weight may be, for example, a percentage (e.g., between 0% and 100%), a numeric value (e.g., between 0 and 1.0 or any other range), a vector, a scalar, or another parameter, which quantifies or represents how strongly a topic is associated with a document. For example, a document may include text or information relating to one or more topics, and a weight associated with each topic may represent or quantify how much a document text pertains to, is about, or is related to each topic. A sum of weights for all topics associated with a document may, for example, be equal to 1.0, 100%, or another value.

Topic weights may, in some aspects, represent a confidence of association of a topic to a document (e.g., by a natural language processor or other method or system). A topic weight (e.g., corresponding to a topic) may represent a confidence, certainty, and/or likelihood that a document is in whole or in part about that topic. For example, a first topic weight (e.g., 0.70 or 70%) may indicate a confidence of 70% that a document is in whole or in part about the first topic, and a second topic weight (e.g., 0.30 or 30%) may indicate a confidence of 30% that the document is in whole or in part about the second document.

In operation 140, an update to an interest signature value (e.g., of a topic in a document) may be generated. An interest signature value may be, for example, a scalar, vector, array, matrix, table, and/or other data structure. An update to an interest signature value (e.g., interest signature) of a topic (e.g., a first topic) for a user may be generated by adding a product of a computed document interest value for the user for the document and the weight of the topic in the document. As discussed herein, an interest signature value term, element, and/or update of a topic for a user may be a product of a computed document interest value for the user for a document and a weight of that topic in the document. Interest signature value terms of a topic for a user may, for example, be generated for one or more documents including that topic. An interest signature value may, for example, be a sum of one or more interest signature value terms.

By way of example, a document interest value for a user (e.g., a first user) for a document may be equal to 0.6 or any other value, and a weight of a first topic (e.g., $1^{st}$ topic) for the document may be 0.7 or any other value. An update to an interest signature value of the first topic for the first user may be generated by adding the product of the document interest value for the first user (e.g., 0.6) and a weight of the first topic (e.g., 0.70) for the document. The product of the document interest value for the first user and the weight of the first topic in the document (e.g., 0.42=(0.6*0.7)) may be added to, for example, an existing interest signature value of the first topic for the first user. An existing interest signature value of the first topic for the first user may, for example, include or be a sum of a previously generated one or more interest signature value terms.

In some aspects, an update to an interest signature value of a second topic (e.g., in a document) for a user may be generated by adding the product of a computed document interest value for the user for the document and the weight of the second topic in the document. As shown in the following table, a document may, for example, include two topics (e.g., $1^{st}$ topic and $2^{nd}$ topic) or any other number of topics and a weight for each topic (e.g., $1^{st}$ topic weight=0.70 and $2^{nd}$ topic weight=0.30). A document interest value for the user for the document may be equal to, for example, 0.6 or any other value.

Example Document Signature and User Interest

| Topic | Weight | $1^{st}$ User Document Interest Value |
|---|---|---|
| $1^{st}$ Topic | 0.70 | 0.60 |
| $2^{nd}$ Topic | 0.30 | |

An update to an interest signature value of a first topic (e.g., $1^{st}$ Topic) for a user may be generated by adding a product of the computed document interest value (e.g., 0.60) for the user for the document and a weight of the first topic in the document (e.g., $1^{st}$ topic weight=0.70). Similarly, an update to an interest signature value of the second topic (e.g., $2^{nd}$ Topic) for the user may be generated by adding a product of the computed document interest value (e.g., 0.60) for the user for the document and a weight of the second topic in the document (e.g., $2^{nd}$ topic weight=0.30).

In some aspects, updates to interest signature values of all topics (e.g., each topic in a document) for a user of the document may be generated. For example, a document may include five or any other number of topics, and an update to an interest signature value of each of the five topics for a user of the document may be generated.

In some aspects, signal information for a second document may be received, a document interest value based on the signal information for a user may be computed, topic information for the document may be received, and an update to an interest signature value of a first topic for a user may be generated by adding the product of the computed document interest value for the user for the second document and the weight of the first topic in the second document.

In some aspects, an update to an interest signature value of a topic (e.g., a first topic) for a second user may be generated. An update to an interest signature value of a first topic (e.g., a first topic in a document) for a second user may generated by adding a product of a computed document interest value for the second user for the document and a weight of the first topic in the document. Similarly, an update to an interest signature value of a second topic (e.g., a second topic in the document) for the second user may be generated by adding a product of the computed document interest value for the second user for the document and a weight of the second topic in the document. Similarly, updates to interest signature values for all users in a set of users (e.g., a group, cluster, organization, and/or other set of one or more users) may be generated.

In some aspects, one or more interest signatures may be stored in a database. For example, a plurality of interest signature values including interest signature values for a query topic may be stored in a database (e.g., database, memory, and/or storage in system 500). In response to a request regarding a query topic, one or more users having a predetermined rank or interest signature value for the query topic may be retrieved and displayed. One or more users may, for example, be ranked, grouped, and/or categorized based on interest signature values for the query topic, and one or more users may be retrieved and displayed based on the ranking, grouping and/or categorization.

In some aspects, one or more users with highest ranked interest signature values for the query topic may be output (e.g., to a user, to a component within system 500, or to another device or system). For example, a user (e.g., an identity of a user) associated with a highest ranked interest signature value for a query topic may be retrieved and output (e.g., displayed to a user). In some aspects, any number of highest ranked users (e.g., a top N users, top-N scoring users, and/or top-N ranking users) may be retrieved and output (e.g., displayed to user).

According to some aspects, all users (e.g., identities of all users) with an interest signature value for the query topic above a threshold value (e.g., threshold interest signature value) may be output (e.g. to a user, a component or system 500, or any other system or device). Interest signature values of a query topic for one or more users may be compared to, for example, a threshold interest signature value, and one or more users associated with interest signature values above the threshold interest signature value may be output. A threshold interest signature value may be, for example, a fixed threshold interest signature value (e.g., a predetermined threshold interest signature, a static threshold interest signature), a varying threshold interest signature value, or any other type of threshold interest signature value. A fixed threshold interest signature value may be any interest signature value generated by, for example, a user, system 500, or any other system or process.

In some aspects, an identity of a group of users associated with a group of interest signature values may be output. Interest signature values (e.g., associated with one or more user(s)) may be categorized into, for example, classes or groups using an automatic grouping, clustering, and/or other approach. An automatic grouping, clustering, or other approach may be, for example, a K-means, difference in means, hierarchical agglomerative clustering (e.g., bottom-up clustering), and/or other method(s). In an automatic grouping approach, a varying threshold interest signature may be generated using, for example, automatic threshold detection and/or other approaches. A varying interest signature value threshold for a topic may, for example, be calculated based on one or more interest signature values for that topic. A varying threshold interest signature may, therefore, be related to interest signature value distribution and may vary as interest signature value data is added, removed, and/or altered. Interest signature values and associated users may be automatically grouped based on a varying threshold interest signature value, and one or more groups of users may be output (e.g., to a user, system 500, or another system or device).

FIG. 2 shows a diagram 200 depicting topics, weights, and a document signature associated with one or more documents according to aspects of the present disclosure. Topic information (e.g., a document signature) for a first document 210 (e.g., Document 1) may include one or more topics 212 (e.g., two topics) and a weight 214 for each topic. Topics 212 relating to a source document may include, for example, topic A and topic B. Topic A and topic B may be any two topics (e.g., restaurants, legal document types, medical topics, or any other topics). Each topic may be associated with a weight (e.g., topic A weight or topic B weight). Document 1 topic weights 214 may represent or quantify how strongly a topic is associated with source document text. A topic A weight 216 may indicate, for example, that 0.70 or 70 percent (%) of Document 1 is about or related to topic A. Similarly, a topic B weight may indicate that 0.30 or 30% of Document 1 is about or related to topic B. Topic weights (e.g., topic A weight and topic B weight) associated with each topic in a document text may, for example, sum to 1.0, 100%, or any other value.

Information for a second document 220 (e.g., Document 2) may include one or more topics 222 (e.g., two topics) and a weight 224 for each topic. Topics 222 relating to Document 2 may include, for example, a topic B and topic C, and each topic may be associated with a weight 224 (e.g., topic B weight and topic C weight). Topic B weight may indicate, for example, that 0.05 or 5% of a second document text is about topic B, and topic C weight may indicate that 0.95 or 95% of the second document text is about topic C. Topic weights (e.g., topic weight B and topic weight C) may, for example, sum to 1.0, 100%, or another value.

Information for a third document 230 (e.g., Document 3) may include one topic 232 (e.g., one topic) and a corresponding weight 234 (e.g., topic C weight). Topic C weight may indicate that 1.0 or 100% of Document 3 is about topic C or that Document 3 is only about topic C.

Information for a fourth document 240 (e.g., Document 4) may include one or more topics 242 and weights 244 for each topic. Topics 242 relating to a fourth document 240 may include, for example, topic A, topic B, and topic D. Each topic may be associated with a weight, for example, topic A weight, topic B weight, and topic D weight.

FIG. 3 shows a diagram of document signal information and document interest values for a user for a document according to aspects of the present disclosure. Signal information for a user of a document 302 may be received by, for example, system 500. A document 302 may be, for example, any document in a set of documents. In this example, a document 302 may be Document 1 as discussed above in connection with FIG. 2. Signal information for a user of a document 302 may include one or more signals 310 (e.g., signal number 1, signal 2, . . . , signal N (e.g., where N is a number of signals)) and one or more signal values 330 each associated with a signal 310. Each of one or more signals 310 may include a signal value 330 related to a type of signal 320 (e.g., associated with each signal 310). Signal types 320 may represent different types of user activity and/or relationship to a document. Signal types 320 may include, for example, user document interaction, document subscription, document access, document editing, and/or document sharing characteristics, patterns, behavior and/or interactions.

By way of example, user document interaction may, for example, include whether a user has "opened a document once" (e.g., signal 1 in row 2 of signals table for user X in Document 1 302), "number of times user opened document" (e.g., signal 2), "how recently a user opened a document" (e.g., signal 3), "span of time in which a user is known to have the document open (e.g., total time over a period of years, months, etc.)" (e.g., signal 4), and/or other characteristics. User document subscription characteristics may, for example, include whether the user is subscribed to the document (e.g., signal 5); a degree of subscription (e.g., not on an Access Control List (ACL) but subscribed, implicitly on the ACL by way of, for example, membership in a group, explicitly on the ACL by specific entry) (e.g., signal 6), and/or other characteristics. User document access characteristics may, for example, include a level and/or type of user access (e.g., read-only, write, moderator, owner, and/or other type of access) (e.g., signal 7), whether the user has "starred" the document (e.g., indicated that the document is important or associated a tag, bookmark, and/or note with the document) (e.g., signal 8), and/or other characteristics. User document editing characteristics may include, for example, whether the user has ever edited the document (e.g., signal 9), whether the user has edited the document within a time period (e.g., one week, one day, or any other time period), and/or other characteristics. User sharing characteristics may include, for example, whether the user has shared the document (e.g., signal 10) with other users or groups of users by, for example, emailing, uploading, transferring, and/or otherwise sharing the document.

Signal values 330 may, for example, represent, quantify, and/or define a user's activity with, association with, and/or relationship to a document (e.g., user X association with Document 1). Signal values 330 may, for example, be many different types of values including, for example, a number value, a range of number values, a period of time (e.g., 2 hours, 3 days, or any other period of time), a text and/or string (e.g., "yes", "no", "editor", "read only", or any other string), a scalar, a vector, an array of values, and/or any other type of value. A signal value 330 may be associated with a type of signal 320 and may be specific to that type of signal. For example, a signal value 330 associated with a signal 310 representing whether a user is currently subscribed to a document may be a string; a scalar and/or number value (e.g., 0.0 or 1.0); a Boolean, two-valued, or binary value (e.g., "true" or "false", "yes" "no"); categorical value; or any other type of value. A categorical value may be, for example, a value in an enumeration of categories (e.g., a list of categories) such that each category is associated with a value (e.g., VIEWER=0.0, COMMENTER=0.3, EDITOR=0.7, OWNER=0.8). Similarly, a signal value 330 associated with a signal 310 representing a level and/or type of user access may be, for example, a string and/or text or other type of signal value.

One or more normalized signal values 340 may, in some aspects, be generated based on one or more signal values 330. Each of one or more signal values 330 may be normalized, converted, scaled, interpolated, and/or transformed to output a corresponding normalized signal value 340. Normalized signal values 340 may be in the range of, for example, zero to one (e.g., 0.0 to 1.0) or any other range. Normalized signal values 340 may be generated based on signal values 330 using, for example, a look-up table, a database, mathematical approaches (e.g., linear, logarithmic, exponential, sinusoidal, parabolic, and/or any other type of transformation, scaling, or interpolation) and/or any other method or system. In some aspects, one or more normalized signal values 340 may be equivalent to one or more signal values 330.

By way of example, for a given signal (e.g., signal 1, signal 2, . . . , signal N), possible signal values may be in a certain range, enumeration, and/or list of values. For example, a signal representing a number of times a user has opened a document (e.g., signal 1) may include values in a range from, for example, zero times (e.g., 0 times) to, for example, 100 times or any other range. In this example, normalized signal values corresponding to each signal value may be arbitrary but will be based on the range, enumeration, and/or list of values. For example, a signal value representing or indicating that a user has opened a document 70 times may be transformed to a normalized value of 0.8, and a signal value of indicating that user has opened a document 8 times may be transformed to a normalized signal value of 0.4.

In a similar example, signal values in units of a period of time (e.g., minutes, hours, and/or any other period of time) may be transformed and/or scaled to a normalized signal value 340 between 0.0 and 1.0 or any other range using a similar approach.

In one example, signal values 330 may be strings and/or text values (e.g., "editor", "explicitly subscribed", "yes", "no", or any other string(s)). String and/or text signal values 330 may be normalized, converted, and/or transformed to a normalized signal value 340 of, for example, a number between 0.0 and 1.0, a percentage, or any other value. Signal values 330 (e.g., stored as strings and/or text) may be normalized using, for example, a table (e.g., look-up table and/or conversion table), string conversion operations, and/or other approaches. A string and/or text signal may, for example, be associated with a set and/or enumeration of possible signal values (e.g., string values). For example, a signal representing levels of document access and/or permissions may include possible values in a hierarchy of descending strength of relationship to a document (e.g., "editor", "comment only", "view only", and other values). A normalized value 340 value based on the string and/or text signal values 330 may be arbitrary but will be based on the hierarchy. For example, a signal value of "editor" may be transformed to a normalized value of 0.7 or any other value, a signal value of "comment only" may be transformed to a normalized signal value of 0.5, and a signal value of "view only" may be transformed to a normalized value of 0.2 or any other value.

In some aspects, a document interest value 370 may be computed based on one or more signal value(s) 330, normalized signal value(s) 340, signal weight(s) 350, and/or other information. A document interest value 370 may be, for example, a sum of products of one or more normalized signal values 340 and associated signal weights 350. A document interest value 370 may be, in some aspects, a sum of products of one or more normalized signal values 340 and associated signal weights 350. A document interest value 370 may be a sum of one or more interest value entries or terms 360 (e.g., a document interest value entry, signal contribution values). An interest value entry 360 may be computed by, for example, multiplying each one or more normalized signal values 340 by a signal weight 350 associated with each normalized signal value 340, and summing the products of each of the normalized signal values 340 and associated signal weights 350.

By way of example, a first signal (e.g., signal number 1 in row 2 of signals table 302) may represent, for example, whether a user has opened a document. A signal value 330 associated with the first signal may be "yes", and a normalized first signal value 340 may be 1.0. A signal weight 350 associated with the first signal (e.g., 0.1) may be multiplied by the normalized first signal value (e.g., 1.0) to generate an interest value entry for the first signal 362 (e.g., 0.1). Similarly, a second signal (e.g., signal number 2 in row 3 of signals table 302) may represent, for example, a number of times a user has opened a document, a signal value 330 associated with the second signal may be 8.0, and a normalized signal value 340 may be 0.4. A normalized second signal value 340 may be generated based on the second signal value (e.g., 8.0) using, for example, a look-up table, a database, mathematical approaches, and/or any other method or system. A signal weight 350 associated with the second signal (e.g., 0.1) may be multiplied by the normalized second signal value (e.g., 0.4) to generate an interest value entry for the second signal 364 (e.g., 0.04). In some aspects, additional interest value entries 360 (e.g., a signal 3 interest value entry, a signal 4 interest value entry, . . . , a signal 10 interest value entry) may be generated based on normalized signal values 340 (e.g., a signal 3 normalized value, a signal 4 normalized value, . . . , a signal 10 normalized value) and signal weights 350 (e.g., a signal 3 weight, a signal 4 weight, . . . , a signal 10 weight) respectively using a similar approach. One or more interest value entries 360 may, for example, be added together, aggregated, accumulated, and/or summed to generate a document interest value 370 (e.g., total interest and/or a total interest value). A document interest value 370 may represent a degree of user interest (e.g., user X's interest) in a document (e.g., Document 1).

FIG. 4 is a diagram of document interest values and interest signature values for a topic according to aspects of the present invention. An update to an interest signature value of a first topic for a user may be generated by, for example, adding a product of a computed document interest value for the user for a document and the weight of the first topic in that document.

In some aspects, interest signatures (e.g., including interest signature values) for one or more users may be updated according to the following steps, process, and/or order of operations. For a first user, a document interest value for that user for a first document may be generated. For the first user of the first document, an update to an interest signature value of a first topic for that user may be generated. An update to an interest signature value of a second topic in the first document may be generated. Similarly, an update to interest signature values of each topic in the first document for the first user may be generated. The process, steps, and/or operations may be repeated for the first user in a second document and/or all documents in a document set. The process, steps, and/or operations may be repeated for a second user and/or all users in a set of users. Other steps, processes, methods, and/or order of steps for generating interest signature values may of course be used.

By way of example, an update to interest signature value(s) of one or more topics for user X may be generated. Document interest values 410 for user X for one or more topics in Document 1 may be computed using, for example, methods and/or approaches discussed in connection with FIG. 3. Document interest values 410 may be generated for one or more documents 420 (e.g., Document 1, Document 2, Document 3, Document 4, and any other documents). A document interest value for Document 1 412 may be, for example, 0.6 or any other value. A document interest value for user X for Document 1 412 (e.g., 0.6) may be equivalent to, for example, the document interest value 370 as computed in connection with FIG. 3. Document interest values 410 for user X for one or more documents 420 (e.g., Document 2, Document 3, Document 4, and/or other documents) may be computed using similar methods and/or approaches to the approach used in calculating a document interest value for Document 1 412. For example, a document interest value for user X for Document 2 may be equal to 0.3, a document interest value for user X for Document 3 may be equal to 0.4, and a document interest value for user X for Document 4 may be equal to 0.9.

In some aspects, topic information for document (e.g., including at least one topic and a weight for each topic) and a computed document interest value for a user for a document be used to generate an update to an interest signature value of a topic for a user (e.g., a first topic). An update to an interest signature value of a first topic for a user may be generated by adding a product of a computed document interest value for the user for the document and a weight of the first topic in the document.

In this example, topic information may be received for one or more documents in a set of documents (e.g., Document 1 450, Document 2 452, Document 3 454, Document 4 456, and possibly other documents), and update(s) to an interest signature for user X 430 may be generated. An interest signature for user X 430 may include, for example, one or more interest signature values 460. Each signature value may be of and/or associated with a topic 440 (e.g., topic A, topic B, topic C, topic D) for user X. Interest signature values 460 of a topic for a user may be updated for each document (e.g., Document 1 450, Document 2 452, Document 3 454, Document 4 456) in a set of documents. In some aspects, interest signature values 460 may be updated for each user (e.g., user X, user Y, user Z) in a set of users.

In this example, for a user X of Document 1 450, an interest signature value of topic A for user X and an interest signature value of topic B for user X may be updated. An interest signature value of topic A for user X 462 may be updated to include a product of a computed document interest value for user X for Document 1 412 (e.g., 0.6) and a weight of topic A in Document 1 216 (e.g., 0.7). An interest signature value of topic A for user X 462 may be updated by adding the product of the computed document interest value for user X for Document 1 412 and a weight of topic A in Document 1 216 (e.g., 0.42, as shown in row 2 column two of User X—Topic Interest Signature 430) to an existing interest signature value 462. In this example, an existing interest signature value 462 may be zero (e.g., 0) or any other value prior to being updated for Document 1; therefore, an updated interest signature value of topic A for user X 462 may be equal to 0.42 after generating an update to the interest signature value of topic A for user X based on Document 1. Similarly, an interest signature value of topic B for user X 464 may be updated to include a product of a computed document interest value for user X for Document 1 412 (e.g., 0.6) and a weight of topic B in Document 1 (e.g., 0.3). In this example, an interest signature value of topic C for user X 466 and an interest signature value of topic D for user X 468 may, for example, not be updated because Document 1 does not include content related to topic C or topic D. The topics and weights as used and/or shown in FIG. 4 may have been taken from and/or may be equivalent to weights in FIG. 2.

In this example, for a user X of Document 2 452, an update to an interest signature value of topic B for user X and an interest signature value of topic C for user X may be generated. An interest signature value of topic B for user X 464 may be updated to include a product of a computed document interest value for user X for Document 2 (e.g., 0.3) and a weight of topic B in Document 2 (e.g., 0.05). In this example, an existing interest signature value of topic B for user X 464 may be equal to the interest signature value update of topic B for user X in Document 1 (e.g., 0.18, as shown in row 3, column 2 of User Interest Signature 430 in FIG. 4). An updated interest signature value of topic B for user X 464 may, therefore, be equal to 0.20 (e.g., 0.20=0.18+(0.3*0.05)). Similarly, an interest signature value of topic C for user X 466 may be updated to include a product of a computed document interest value for user X for Document 2 (e.g., 0.3) and a weight of topic C in Document 2 (e.g., 0.95). In this example, an interest signature value of topic A for user X 462 and an interest signature value for user X of topic D 468 may, for example, not be updated for Document 2 because Document 2 does not include content related to topic A or topic D.

In this example, for a user X of Document 3 454, interest signature values for user X of topic C in Document 3 454 may be updated. An interest signature value of topic C for user X 466 may be updated to include a product of a computed document interest value for user X for Document 3 (e.g., 0.4) and a weight of topic C in Document 3 (e.g., 1.0).

Similarly, for a user X of Document 4 456, an update to an interest signature value of topic A for user X 462, an interest signature value of topic B for user X 464, and an interest signature value of topic D for user X 466 may be generated.

Interest signature values of a topic for a user may be, for example, a sum of one or more interest signature value terms or entries of that topic for that user in one or more documents. In some aspects, interest signatures values of a topic for a user may be updated by adding one or more interest signature elements of that topic for that user in one more documents. For example, an interest signature of topic A for user X 462 may be a sum of, for example, an interest signature value term of topic A for user X of topic A in Document 1 (e.g., 0.42= (0.60*0.70)) and an interest signature value term of topic A for user X in Document 4 (e.g., 0.45=(0.9*0.50)). Similarly, each interest signature value of a topic for a user (e.g., interest signature values 462, 464, 466, and 468) may be a sum of interest signature value term of that topic for that user (e.g., user X) in one or more documents.

In some aspects, an update to an interest signature value of a topic (e.g., topic(s) A, B, C, D and/or any other topics) for a second user may be generated using a similar approach. Similarly, updates to interest signature values for all users in a set of users (e.g., user X, user Y, and user Z or any other set of users) may be generated. Each interest signature value may be of a topic (e.g., topic A, B, C, D or any other topic) for a user (e.g., a user in a set of users).

FIG. 5 shows an illustrative computer system 500 suitable for implementing methods and systems according to an aspect of the present disclosure. The computer system may comprise, for example, a computer running any of a number of operating systems. The above-described methods of the present disclosure may be implemented on the computer system 500 as stored program control instructions.

Computer system 500 includes processor 510, memory 520, storage device 530, and input/output structure 540. One or more input/output devices may include a display 545. One or more busses 550 typically interconnect the components, 510, 520, 530, and 540. Processor 510 may be a single or multi core.

Processor 510 executes instructions in which aspects of the present disclosure may comprise steps described in one or more of the Figures. Such instructions may be stored in memory 520 or storage device 530. Data and/or information may be received and output using one or more input/output devices.

Memory 520 may store data and may be a computer-readable medium, such as volatile or non-volatile memory, or any transitory or non-transitory storage medium. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations for system 500. Input/output devices utilizing these structures may include, for example, keyboards, displays 545, pointing devices, and microphones—among others. As shown and may be readily appreciated by those skilled in the art, computer system 500 for use with the present disclosure may be implemented in a desktop computer package 560, a laptop computer 570, a hand-held computer, for example a tablet computer, personal digital assistant, mobile device, or smartphone 580, or one or more server computers that may advantageously comprise a "cloud" computer 590.

The systems and methods discussed herein and implemented using, for example, system 500, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for determining topical interest, comprising:
   receiving signal information for a user of a document, the information including at least one signal value representing the user's activity with or relationship to the document and a signal weight for each signal value;
   computing a normalized signal value for each of the at least one signal values;
   computing a document interest value based on a sum of products of each normalized signal value and the signal weight associated with each signal value for the user;
   receiving topic information for the document, the information including at least one topic and a weight for each topic, where the topic relates to content of the document, and the weight represents a level of confidence that the topic is associated with the document; and
   generating an update to an interest signature value of a first topic for the user by adding a product of the computed document interest value for the user for the document and a weight of the first topic in the document.

2. The method of claim 1, further comprising:
   generating an update to an interest signature value of a second topic for the user by adding a product of the computed document interest value for the user for the document and a weight of the second topic in the document.

3. The method of claim 1, wherein all the steps are repeated for all topics in the document.

4. The method of claim 1, wherein all the steps are repeated for a second document.

5. The method of claim 1, further comprising:
   receiving signal information for a second user of the document;
   computing a document interest value for the second user based on the signal information for the second user; and
   generating an update to an interest signature value of the first topic for a second user by adding a product of the computed document interest value for the second user for the document and a weight of the first topic in the document.

6. The method of claim 5, wherein the steps are repeated for all users in a set of users.

7. The method of claim 1, further comprising:
   storing a plurality of interest signature values in a database; and
   retrieving and displaying one or more users from the database having a predetermined rank or interest signature value for a query topic in response to a request regarding the query topic.

8. The method of claim 7, wherein the retrieving and displaying step comprises:
   outputting one or more users with highest ranked interest signature values corresponding to the query topic.

9. The method of claim 7, wherein the retrieving and displaying step comprises:
   outputting all users with interest signature values corresponding to the query topic above a threshold value.

10. The method of claim 1, wherein the signal information comprises one or more signals selected from the group consisting of:
    user document interaction characteristics, user document subscription characteristics, user document access characteristics, user document editing characteristics, and user document sharing characteristics.

11. A computer-implemented system for determining topical interest comprising:
    a non-transitory memory; and
    said system configured to:
      receive signal information for a user of a document, the information including at least one signal value representing the user's activity with or relationship to the document and a signal weight for each signal value;
      compute a normalized signal value for each of the at least one signal values;
      compute a document interest value based on a sum of products of each normalized signal value and the signal weight associated with each signal value for the user;
      receive topic information for the document, the information including at least one topic and a weight for each topic, where the topic relates to content of the document, and the weight represents a level of confidence that the topic is associated with the document; and
      generate an update to an interest signature value for the user of a first topic by adding a product of the computed document interest value for the user for the document and a weight of the first topic in the document.

12. The system of claim 11, further configured to:
    generate an update to an interest signature value of a second topic for the user by adding a product of the computed document interest value for the user for the document and a weight of the second topic in the document.

13. The system of claim 11, further configured to:
    receive signal information, compute a document interest value, receive topic information, and generate an update to an interest signature value for all topics in the document.

14. The system of claim 11, further configured to:
    receive signal information, compute a document interest value, receive topic information, and generate an update to an interest signature value for a second document.

15. The system of claim 11, further configured to:
    store a plurality of interest signature values in a database; and
    retrieve and display one or more users from the database having a predetermined rank or interest signature value for a query topic in response to a request regarding the query topic.

16. The system of claim 15, wherein to retrieve and display one or more users the system is to:
    output one or more users with highest ranked interest signature values corresponding to the query topic.

17. The system of claim 15, wherein to retrieve and display one or more users the system is to:

output all users with interest signature values corresponding to the query topic above a threshold value.

18. A non-transitory computer storage medium having computer executable instructions which when executed by a computer cause the computer to perform operations comprising:
- receiving signal information for a user of a document, the information including at least one signal value representing the user's activity with or relationship to the document and a signal weight for each signal value;
- computing a normalized signal value for each of the at least one signal values;
- computing a document interest value based on a sum of products of each normalized signal value and the signal weight associated with each signal value for the user;
- receiving topic information for the document, the information including at least one topic and a weight for each topic, where the topic relates to content of the document, and the weight represents a level of confidence that the topic is associated with the document; and
- updating an interest signature value for the user of a first topic by adding the product of the computed document interest value for the user for the document and a weight of the first topic for the document.

19. The non-transitory computer storage medium of claim 18, which further causes the computer to perform a further operation comprising:
- updating an interest signature value of a second topic for the user by adding the product of the computed document interest value for the user for the document and a weight of the second topic for the document.

20. The non-transitory computer storage medium of claim 18, which further causes the computer to perform a further operation comprising:
- storing a plurality of interest signature values in a database; and
- retrieving and displaying one or more users from the database having a predetermined rank or interest signature value for a query topic in response to a request regarding the query topic.

* * * * *